(12) United States Patent
Lewis et al.

(10) Patent No.: US 7,434,143 B2
(45) Date of Patent: Oct. 7, 2008

(54) METHOD AND ARRANGEMENT FOR DETECTING A COLLISION IN A COMMUNICATION NETWORK

(75) Inventors: Michael Lewis, Märsta (SE); Mikael Hjelm, Västerås (SE)

(73) Assignee: Infineon Technologies AG, Munich (DE)

( * ) Notice: Subject to any disclaimer, the term of this patent is extended or adjusted under 35 U.S.C. 154(b) by 629 days.

(21) Appl. No.: 10/868,409

(22) Filed: Jun. 15, 2004

(65) Prior Publication Data

US 2005/0034011 A1   Feb. 10, 2005

(30) Foreign Application Priority Data

Jun. 24, 2003   (SE) .................................... 0301834

(51) Int. Cl.
*H03M 13/00* (2006.01)
(52) U.S. Cl. ........................ 714/776; 714/758
(58) Field of Classification Search ................ 714/776, 714/751, 746, 758, 709, 807, 821; 370/474
See application file for complete search history.

(56) References Cited

U.S. PATENT DOCUMENTS

| | | | | |
|---|---|---|---|---|
| 5,251,203 A | * | 10/1993 | Thompson | 370/407 |
| 5,450,416 A | * | 9/1995 | Bowcutt et al. | 714/712 |
| 5,657,326 A | | 8/1997 | Burns et al. | 370/349 |
| 5,889,772 A | * | 3/1999 | Fischer et al. | 370/346 |
| 6,581,177 B1 | * | 6/2003 | Segal et al. | 714/751 |
| 6,735,217 B1 | * | 5/2004 | Webber et al. | 370/447 |
| 6,771,774 B1 | * | 8/2004 | Phan et al. | 379/413.02 |
| 7,104,534 B2 | * | 9/2006 | Currivan et al. | 269/32 |
| 7,233,602 B2 | * | 6/2007 | Chen et al. | 370/445 |
| 2004/0057469 A1 | * | 3/2004 | Nuss et al. | 370/535 |

FOREIGN PATENT DOCUMENTS

| | | |
|---|---|---|
| EP | 0 706 276 A1 | 4/1996 |
| EP | 1 298 949 A1 | 4/2003 |
| WO | WO 03/050560 A1 | 6/2003 |

* cited by examiner

*Primary Examiner*—Jacques Louis-Jacques
*Assistant Examiner*—Fritz Alphonse
(74) *Attorney, Agent, or Firm*—Dicke, Billig & Czaja, PLLC

(57) ABSTRACT

A method and an arrangement for detecting a collision in a communication network, such as a WLAN, on which data are sent in frames of variable lengths separated by inter-frame spaces, each frame including a header and a data payload field where the header includes information of the length of the frame, is provided. The method comprises the steps of estimating a noise level (41; 41-42) of a frame, the header of which being read by a receiver, preferably using constellation error measurement, comparing the estimated noise level with a reference noise level value, and detecting a collision with another weaker frame depending on the outcome of the comparison.

18 Claims, 2 Drawing Sheets

METHOD AND ARRANGEMENT FOR DETECTING A COLLISION IN A COMMUNICATION NETWORK

PRIORITY

This application claims priority to Swedish application no. 0301834-8 filed Jun. 24, 2003.

TECHNICAL FIELD OF THE INVENTION

The present invention generally relates to the field of communications and more specifically the invention relates to a method and an arrangement for detecting a collision in a communication network. The invention is particularly adapted for use in WLAN's (wireless local area networks) such as those operating in the 5 GHz bands.

DESCRIPTION OF RELATED ART AND BACKGROUND OF THE INVENTION

The ETSI regulations for operation of WLAN's in the 5 GHz band in Europe require the ability to detect primary users, i.e. radar systems. It is likely that similar regulations will be brought into effect for operation in the USA and elsewhere. In order to perform this detection, it is necessary to measure received signal strength during periods when it is known that the local WLAN is not transmitting. Radar signals typically consist of periodic short pulses of radio energy in a fairly narrow beam, which is swept periodically around the radar transmitter. This means that detection of the signal relies on making a measurement when the radar transmitter is directed towards a WLAN receiver and also during an instant when a pulse is being transmitted.

The 802.11h standard provides mechanisms whereby quiet periods can be specified, allowing for such measurements to take place. However, these quiet periods imply reduced throughput, and it may not be possible to meet the regulatory requirements for detecting slow-scanning radars when only using quiet period measurements if such measurements are not to take up an unreasonable proportion of the channel capacity, since the probability that the radar beam is directed towards the WLAN receiver during any measurement period is too low.

The 802.11 WLAN standard defines a number of periods when stations should not be transmitting, the so-called inter-frame spaces (IFS). After each transmitted frame, all stations should wait at least the short inter-frame space (SIFS) duration before transmitting, and in some situations a longer inter-frame space is defined. In principle, it is possible to perform radar detection measurements during such inter-frame spaces and thereby greatly increase the probability of detecting radar signals.

SUMMARY OF THE INVENTION

The primary difficulty in using these inter-frame spaces for detection of radar signals is the possibility of false alarms due to collisions. Since 802.11 WLAN is a contention-based protocol, it is possible for two or more stations to begin transmitting simultaneously. If the stronger of the two frames is shorter in duration than the weaker one, the weaker frame will extend into the IFS period as perceived by the receiver. If the frame lengths are random, there is a 50/50 chance that the stronger frame is shorter than the weaker one. If the weaker frame has a power level greater than the radar detection threshold, the energy of the weaker frame will trigger a radar detection false alarm.

How the receiver perceives a collision depends on the relative strength of the transmissions, and the kind of modulation in use, i.e. the SNR (signal-to-noise) requirement of the modulation for successful reception.

If the signals are of comparable strength at the receiver, it will not be possible to successfully decode either signal. It is unlikely for it even to be possible to decode the length or modulation type of the data payload of one of the two signals. In this case, the end of the frame is not clearly defined and can only be detected when the received energy level drops. It is questionable whether it is desirable or even possible to perform an IFS measurement at this time.

If one signal is significantly stronger than the other signal, the other signal will appear simply as interference within the band. Whether or not it is possible to successfully decode the transmitted data will depend on the relative signal strengths, transmission rate and channel properties. It should be noted however that it is significantly more likely to be able to decode the header, which contains information about frame length and modulation type, since it is typically transmitted using the most robust modulation type. Hence, it is likely that the end of the transmission will be known and the expected start of the IFS period will be well defined. However, due to the reasons set forward above, it is important not to use the IFS for radar measurements if the interfering signal has an energy greater than the radar detection threshold since it is possible that the interfering signal will extend into the IFS.

One possible strategy to reduce false alarm rate would be to exclude those frames where a decoding error is detected by a CRC (Cyclic Redundancy Code) check. However, this is ineffective. Firstly, there are a wide range of signal-to-interference ratio (SIR)/modulation combinations that will allow successful reception while still triggering radar detection false alarms. Secondly, the use of CRC failure to exclude radar measurements will also exclude many situations where a radar actually has come to bear on the WLAN receiver since the pulses of radar energy will very likely cause errors in reception.

It is thus an object of the present invention to provide a method and an arrangement, respectively, for detecting a collision between two frames of significantly different strengths, where the header of the stronger one of the two frames is capable of being read by a receiver and the weaker one of the two frames appears as noise to the receiver.

This object can according to the present invention be attained by a method for detecting a collision in a communication network, on which data are sent in frames of variable lengths separated by inter-frame spaces, each frame including a header and a data payload field where the header includes information of the length of the frame, comprising the steps of:

estimating a noise level of a frame, the header of which being read by a receiver, comparing the estimated noise level with a reference noise level value, and detecting a collision with another weaker frame depending on the outcome of the comparison.

The estimated noise level can be based on constellation error measurement. The communication network can be a WLAN. The frames can be transmitted on a channel using a digital modulation technique, and the step of estimating comprises the steps of:

for each carrier used by the modulation technique estimating a channel transfer function, thereby establishing the signal constellation points of the carrier, determining a noise level of each carrier used by the modulation technique from measurement of a distance from the received carrier signal to one, preferably the nearest one, of the signal constellation points of the carrier, and summing the noise levels.

A collision with another weaker frame can be detected if the estimated constellation-based noise level is higher than the reference noise level value. The reference noise level value can be determined based on statistical fluctuations in the channel estimate and the received signal, multipath spill over, and transmitter vector error, caused for example by non-linearities in a transmitting power amplifier. The communication network may use a frequency band, which is used for transmissions by a primary user, and a primary user detection measurement can be performed in the inter-frame space following the frame received by the receiver provided that a collision with another weaker frame is not detected. The communication network may use a frequency band, which is used for transmissions by a primary user, primary user detection measurements can be performed in inter-frame spaces separating the frames of variable lengths, and the primary user detection measurements can be disabled in the inter-frame space following the frame received by the receiver provided that a collision with another weaker frame is detected. The primary user can be a radar system. The receiver can be an access point and the steps of estimating a noise level, comparing the estimated noise level with a reference noise level value, and detecting a collision can be performed by the access point.

The object can also be achieved by an arrangement for detecting a collision in a communication network, on which data are sent in frames of variable lengths separated by inter-frame spaces, each frame including a header and a data payload field where the header includes information of the length of the frame, comprising an estimator for estimating a noise level of a frame, the header of which being read by a receiver, a comparator for comparing the estimated noise level with a reference noise level value, and a detector for detecting a collision with another weaker frame depending on the outcome of the comparison.

The estimated noise level can be based on constellation error measurement. The communication network can be a WLAN. The frames can be transmitted on a channel using a digital modulation technique, and the estimator can be provided for estimating each carrier used by the modulation technique, a channel transfer function, thereby establishing the signal constellation points of the carrier, determining a noise level of each carrier used by the modulation technique from measurement of a distance from the received carrier signal to one, preferably the nearest one, of the signal constellation points of the carrier, and summing the noise levels. The detector can be provided for detecting a collision with another weaker frame if the estimated constellation-based noise level is higher than the reference noise level value. The communication network may use a frequency band, which is used for transmissions by a primary user, particularly a radar system, and primary user detection measurements, particularly radar detection measurements, can be performed in inter-frame spaces separating the frames of variable lengths on the communication network, the arrangement may further comprise means connected to the detector for disabling the primary user detection measurements in the inter-frame space following the frame received by the receiver provided that a collision with another weaker frame is detected by the detector.

By estimating a noise level of a frame received by the receiver and comparing the estimated noise level with a reference noise level value followed by detecting a transmission collision with another weaker frame depending on the outcome of the comparison, a method is obtained by which a collision of the above kind effectively can be detected.

Preferably, the invention is implemented in a WLAN system, particularly an OFDM-based WLAN system such as the one defined in IEEE 802.11a. The noise level estimated is based on constellation error measurement of the received signal.

An example of when the present invention is useful is when a radar detection measurement is to be performed at the end of the received frame: in this case, if the colliding transmission is longer than the received transmission and is stronger than the radar detection threshold, a false radar detection alarm will occur. By determining that a collision has occurred in accordance with the invention, the radar detection measurement can be disabled.

While the present invention is described in the context of improving false alarm performance for radar detection measurements in WLAN's, it shall nevertheless be appreciated that it is quite general and can be applied to any situation where it is advantageous to be able to determine whether collisions have occurred, e.g. for measuring system performance.

It shall further be appreciated that the present invention may be implemented in access point(s) of the network, in mobile stations connected to the network, or in both. Yet alternatively, the invention may be implemented in any other kind of network node being capable of transmitting and receiving on the network.

Further characteristics of the invention, and advantages thereof, will be evident from the following detailed description of preferred embodiments of the present invention given hereinafter and the accompanying FIGS. 1-4, which are given by way of illustration only, and shall thus not limit the scope of the present invention.

DETAILED DESCRIPTION OF EMBODIMENTS

Figure 1:
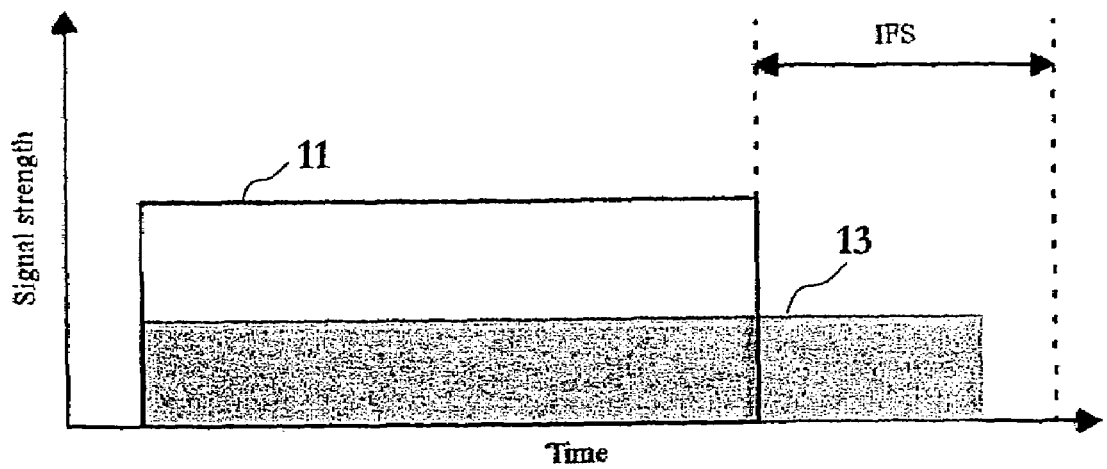
FIG. 1 is a diagram of the signal strength versus time illustrating a collision of a strong signal with a weak signal.

FIG. 1 illustrates a collision of a strong frame signal 11 with a weak frame signal 13 on an OFDM-based WLAN, where the weaker frame signal is longer in time, and extends into the inter-frame space IFS, which starts at the end of the stronger frame 11.

If an access point, a mobile station or other transceiver, hereinafter referred to as an access point, connected to the network (not illustrated) is capable of reading the header of the stronger frame signal 11, the weaker frame signal 13 will appear as noise to the access point. In the header of the stronger frame information as to the length of the frame is contained, and if that information is retrieved by the access point it knows when the inter-frame space IFS following the frame signal starts independent on whether the remaining content of the frame, i.e. the data and the CRC fields, is readable.

Further, if the access point has to check for radar transmissions it may typically do so in the inter-frame spaces IFS, when it should be quiet on the network. In such a radar detection measurement the access points measure the strength of any occurring signal within the frequency band as used by the network. If a radio signal stronger than a radar threshold level is measured a radar system in use is indicated. However, in the situation as illustrated in FIG. 1 a false radar indication will be obtained due to the presence of the colliding weaker frame signal 13 still being transmitted in the inter-frame space IFS since the weaker frame signal 13 is stronger than the radar threshold level.

Figure 2:
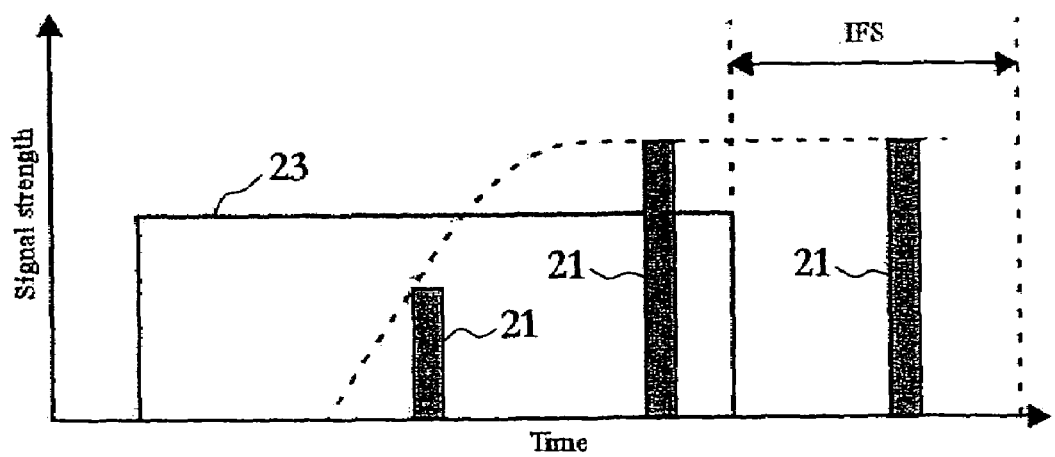
FIG. 2 is a diagram of the signal strength versus time illustrating a radar signal coming to bear during frame reception.

In FIG. 2 is illustrated how a radar signal 21 comes to bear during reception of a frame signal 23. This clearly illustrates why the decoding error as detected by a CRC (Cyclic Redundancy Code) check is unsuitable for excluding following inter-frame spaces from being used for radar detection measurements: it would exclude many situations where a radar signal actually has come to bear on the access point of the WLAN since the pulses of radar energy will very likely cause errors in reception as illustrated. Further, there could occur many situations, which allow successful reception of the frame signal while still triggering radar detection false alarms e.g. due to collisions.

From the above, it is clear that it is desirable to be able to determine whether an interfering signal is present at the beginning of the signal, i.e. whether a collision has occurred.

This is according to the present invention accomplished by measuring the noise level of the received signal within the signal constellation(s) compared to the signal level of each carrier used by the digital multicarrier modulation technique. However, the invention is applicable to any modulation technique, where it is possible to estimate the noise level based on the received signal, for example single carrier QAM/PSK modulation.

Figure 3:
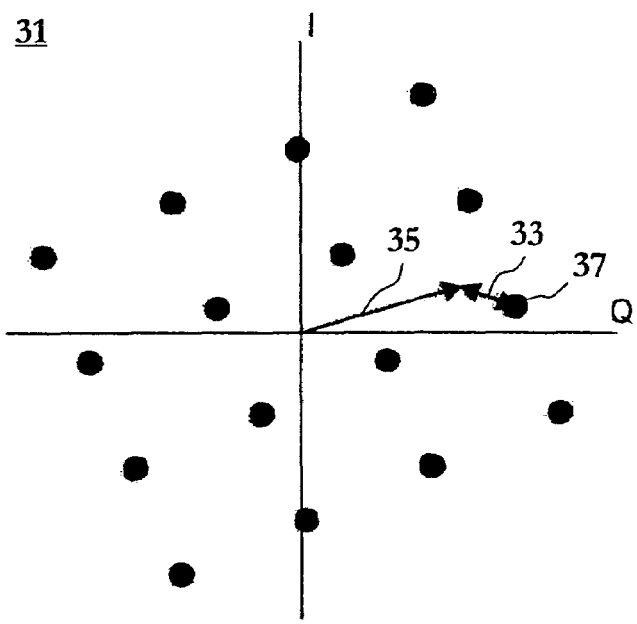
FIG. 3 illustrates estimation of a constellation error.

The first stage in this process is for each of the carriers estimating a channel transfer function, thereby establishing the constellation points, an example of which is shown by 31 in FIG. 3. The second stage is to determine a noise level of each of the carriers from measurement of a distance 33 from the received carrier signal 35 to the correct signal constellation point 37, which in most cases should be the constellation point nearest the received carrier signal.

By summing the noise levels across all carriers, and possibly also comparing the sum with the signal level, the level of interfering signals can be determined. If the estimated interference level, possibly plus a safety margin, is larger than the radar detection threshold level, it is determined that a collision has occurred that will prevent radar detection measurement from being made in the following inter-frame space IFS. On the other hand, if the estimated interference level is less than this, it is safe to perform radar detection measurements during the following inter-frame space IFS.

The OFDM physical layer according to the present invention is equipped with a constellation-based error estimation function. When receiving an OFDM frame, initial detection of the signal is performed during the short preamble section of the frame. The channel estimation is performed during the long preamble section of the frame. Next, the header is received which contains information about the length and modulation format of the data payload. It is during this header, which typically contains a BPSK-modulated OFDM symbol, that the constellation-based error estimate is performed.

The fact that the modulation format is BPSK makes the error estimate as accurate as possible, since the chance of measuring the distance to the incorrect constellation point is minimized due to the existence of only two signal constellation points.

Further, if the nearest constellation point should be incorrect error correction coding in the transmitted frame may be used to indicate such a situation. Hence, the signal can be re-modulated and the constellation error can be measured based on these constellation points.

The fact that the header is located in the beginning of the OFDM frame also makes it well suited for the purposes of radar detection, since there is a minimum chance of the error measurement being disturbed by radar thereby inhibiting radar detection. In the event that either the interfering signal or a radar signal is so strong as to disrupt reception of the header, it will in any case not be possible to determine the end of the frame accurately and thereby determine the IFS period start.

Figure 4:
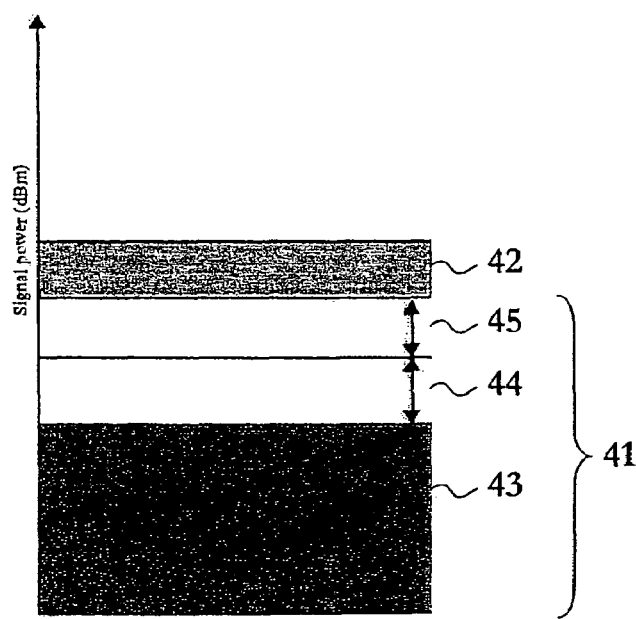
FIG. 4 illustrates various error components in estimation of a noise level.

There are a number of sources of error in the noise level measurement as depicted in FIG. 4. The size of the noise level 41 together with the required size of a safety margin 42, which depend on the known error margin in estimating absolute signal level, determine whether or not to enable radar detection.

The different sources of error may be summarized as follows. Firstly, there is a random measurement error 43 stemming from statistical fluctuations in the channel estimate and the received signal. A second source of error in the measurement comes from multipath delayed signal elements, which spill over out of the cyclic prefix 44. This causes an increased noise level that is proportional to the transmitted signal power and hence irreducible. A third source of error is transmitter vector error 45, caused for example by non-linearities in the transmitting power amplifier. This is also proportional to transmitted signal power.

Whether it is possible or not to perform radar detection after receiving a frame when no collision has occurred depends on the level of these components, and the absolute level of the measured noise over the signal strength. Fortunately, the frames, which have the highest multipath energy, are also likely to be the frames with the lowest absolute signal level, and hence the absolute error magnitude will be small.

The constellation-based error provides what should be an effective means of determining whether an interfering signal was present at the beginning of the frame at such a level as to cause a false radar detection. The required MAC firmware is a simple decision as to whether to disregard radar detection indications or not at the end of each received frame.

We claim:

1. A method for detecting a collision in a communication network, on which data are sent in frames of variable lengths separated by inter-frame spaces, each frame including a header and a data payload field where the header includes information of the length of the frame, comprising the steps of:

estimating a noise level of a frame, the header of which being read by a receiver, comparing said estimated noise level with a reference noise level value, detecting a collision with another weaker frame depending on the outcome of said comparison wherein said communication network uses a frequency band, which is used for transmissions by a primary user, performing primary user detection measurements in inter-frame spaces separating the frames of variable lengths, and disabling said primary user detection measurements in the inter-frame space following said frame received by said receiver provided that a collision with another weaker frame is detected.

2. The method of claim 1, wherein said estimated noise level is based on constellation error measurement.

3. The method of claim 2, wherein said communication network is a WLAN.

4. The method of claim 3, wherein said frames are transmitted on a channel using a digital modulation technique, and said step of estimating comprises the steps of:
for each carrier used by said modulation technique estimating a channel transfer function, thereby establishing the signal constellation points of the carrier,
determining a noise level of each carrier used by said modulation technique from measurement of a distance from the received carrier signal to one, preferably the nearest one, of the signal constellation points of the carrier, and
summing said noise levels.

5. The method of claim 1, wherein said communication network is a WLAN.

6. The method of claim 5, wherein said frames are transmitted on a channel using a digital modulation technique, and said step of estimating comprises the steps of:
for each carrier used by said modulation technique estimating a channel transfer function, thereby establishing the signal constellation points of the carrier,
determining a noise level of each carrier used by said modulation technique from measurement of a distance from the received carrier signal to one, preferably the nearest one, of the signal constellation points of the carrier, and
summing said noise levels.

7. The method of claim 1, wherein a collision with another weaker frame is detected if said estimated constellation-based noise level is higher than said reference noise level value.

8. The method of claim 7, wherein said reference noise level value is determined based on statistical fluctuations in the channel estimate and the received signal, multipath spill over, and transmitter vector error, caused for example by non-linearities in a transmitting power amplifier.

9. The method of claim 1, wherein said communication network uses a frequency band, which is used for transmissions by a primary user, and wherein a primary user detection measurement is performed in the inter-frame space following said frame received by said receiver provided that a collision with another weaker frame is not detected.

10. The method of claim 9, wherein said primary user is a radar system.

11. The method of claim 1, wherein said primary user is a radar system.

12. A method for detecting a collision in a communication network, on which data are sent in frames of variable lengths separated by inter-frame spaces, each frame including a header and a data payload field where the header includes information of the length of the frame, comprising the steps of:
estimating a noise level of a frame, the header of which being read by a receiver,
comparing said estimated noise level with a reference noise level value, and
detecting a collision with another weaker frame depending on the outcome of said comparison, wherein said receiver is an access point and said steps of estimating a noise level, comparing said estimated noise level with a reference noise level value, and detecting a collision are performed by said access point.

13. An arrangement for detecting a collision in a communication network, on which data are sent in frames of variable lengths separated by inter-frame spaces, each frame including a header and a data payload field where the header includes information of the length of the frame, comprising:
an estimator for estimating a noise level of a frame, the header of which being read by a receiver, wherein said frames are transmitted on a channel using a digital modulation technique, and said estimator is provided for:
estimating for each carrier used by the modulation technique, a channel transfer function, thereby establishing the signal constellation points of the carrier,
determining a noise level of each carrier used by the modulation technique from measurement of a distance from the received carrier signal to one, preferably the nearest one, of the signal constellation points of the carrier, and
summing said noise levels,
a comparator for comparing said estimated noise level with a reference noise level value, and
a detector for detecting a collision with another weaker frame depending on the outcome of said comparison.

14. The arrangement of claim 13, wherein said estimated noise level is based on constellation error measurement.

15. The arrangement of claim 14, wherein said communication network is a WLAN.

16. The arrangement of claim 13, wherein said communication network is a WLAN.

17. The arrangement of claim 13, wherein said detector is provided for detecting a collision with another weaker frame if said estimated constellation-based noise level is higher than said reference noise level value.

18. An arrangement for detecting a collision in a communication network, on which data are sent in frames of variable lengths separated by inter-frame spaces, each frame including a header and a data payload field where the header includes information of the length of the frame, comprising:
an estimator for estimating a noise level of a frame, the header of which being read by a receiver,
a comparator for comparing said estimated noise level with a reference noise level value and
a detector for detecting a collision with another weaker frame depending on the outcome of said comparison, wherein said communication network uses a frequency band, which is used for transmissions by a primary user, particularly a radar system, and primary user detection measurements, particularly radar detection measurements, are performed in inter-frame spaces separating the frames of variable lengths on said communication network, said arrangement further comprising means connected to said detector for disabling said primary user detection measurements in the inter-frame space following said frame received by said receiver provided that a collision with another weaker frame is detected by said detector.

* * * * *